United States Patent [19]

Oshikubo

[11] Patent Number: 4,467,942

[45] Date of Patent: Aug. 28, 1984

[54] REPEATING DISPENSER

[76] Inventor: Yuuji Oshikubo, 1-17-3, Nakashizu, Sakura-shi, Chiba-ken, Japan

[21] Appl. No.: 373,273

[22] Filed: Apr. 29, 1982

[51] Int. Cl.³ .............................................. G01F 11/06
[52] U.S. Cl. ........................................ 222/44; 222/47; 222/287; 222/309; 222/327; 222/391; 73/864.18
[58] Field of Search .............................. 222/41, 43–44, 222/46–47, 287–288, 309, 326–327, 378, 391; 73/864.16, 864.17, 864.18, 864.13

[56] References Cited

U.S. PATENT DOCUMENTS

| | | | |
|---|---|---|---|
| 4,022,207 | 5/1977 | Citrin | 222/391 X |
| 4,084,730 | 4/1978 | Franke et al. | 222/309 X |
| 4,099,548 | 7/1978 | Sturm et al. | 222/391 X |
| 4,316,558 | 2/1982 | Kubiak | 222/327 X |
| 4,406,170 | 9/1983 | Fuhn | 222/309 X |

FOREIGN PATENT DOCUMENTS 1090449 10/1960 Fed. Rep. of Germany ...... 222/309

*Primary Examiner*—Charles A. Marmor
*Attorney, Agent, or Firm*—James E. Nilles

[57] ABSTRACT

A repeating dispenser comprising a tubular main body, an actuating member slidably disposed in the main body with the upper end thereof projecting out of the upper end of the main body and having a pressure button thereon, a spring for biasing upwards the actuating member, a spring retainer slidably disposed in the main body and abutting normally with the lower end of the actuating member to transmit the biasing force of the spring to the actuating member, a stop provided on the inner surface of the main body for abutting with the spring retainer in the non-actuated condition of the dispenser, a pawl pivotally connected to the spring retainer, a pawl spring for biasing the pawl in the radially outward direction, a rack shaft slidably provided on a side surface of the main body and having a plurality of rack teeth thereon for engaging with said pawl, a device for preventing the pawl from engaging with the rack shaft when the spring retainer abutting with the stop, a suction button connected to the rack shaft and being slidable along a longitudinal recess in the main body, and a cylinder piston device with the cylinder thereof being releasably connected to the main body and the piston thereof being releasably connected to the lower end of the rack shaft.

5 Claims, 7 Drawing Figures

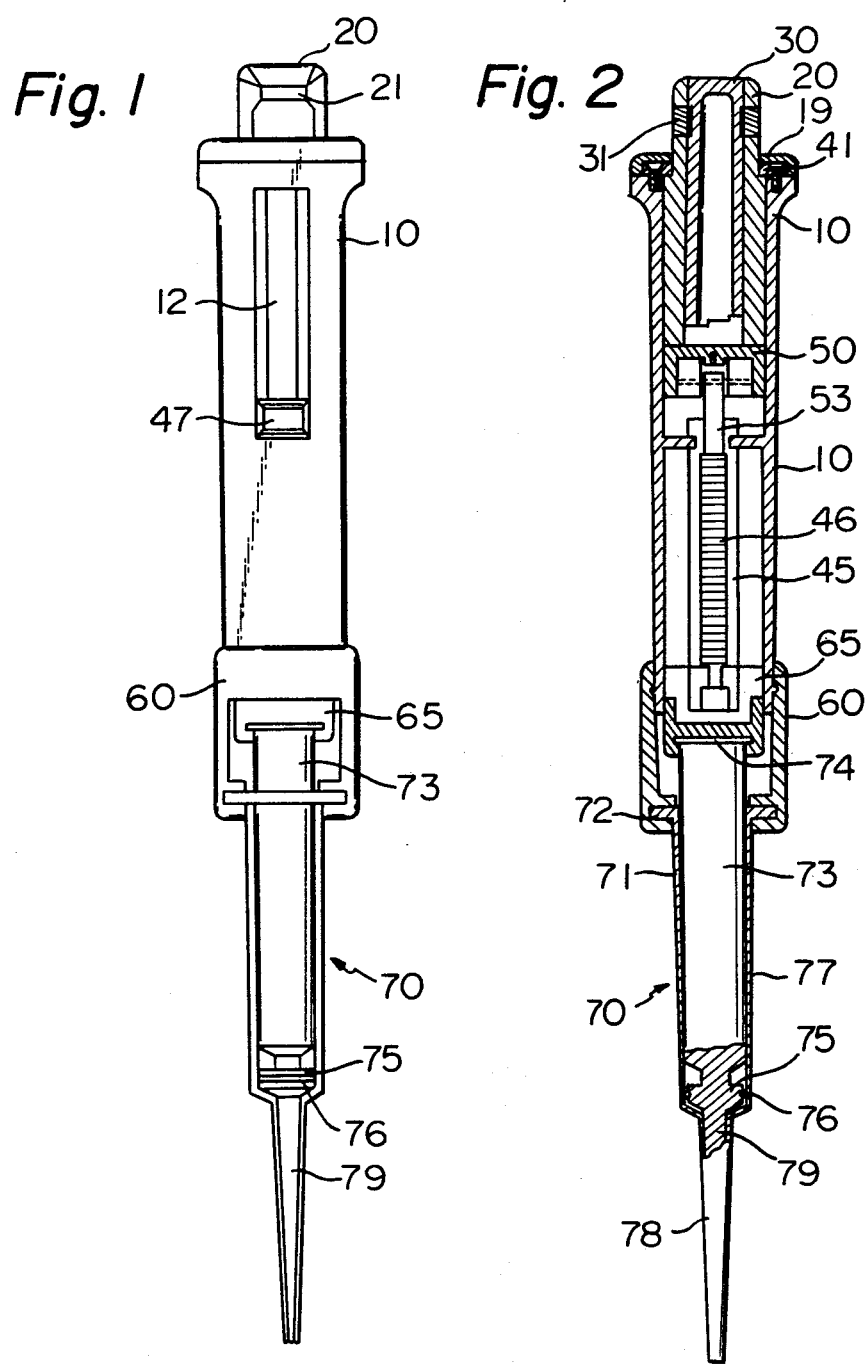

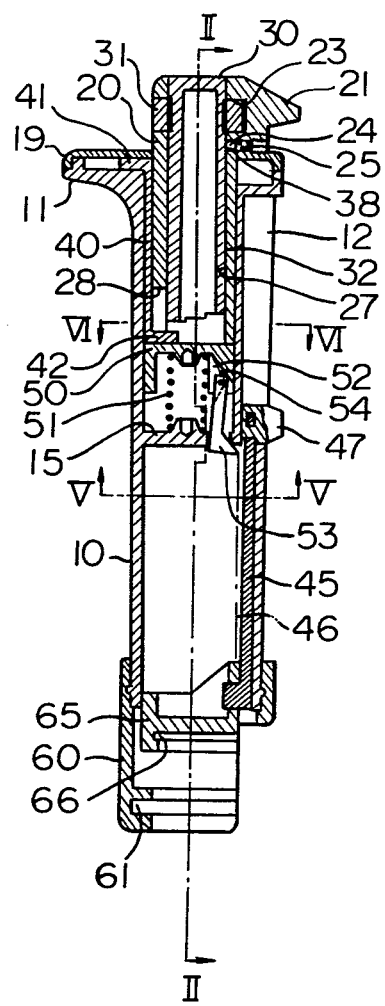
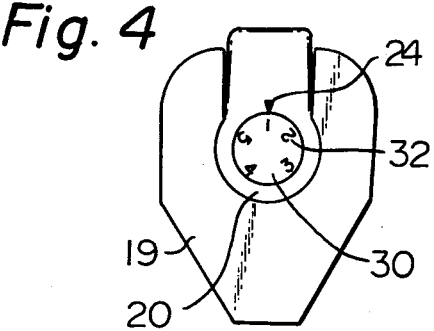
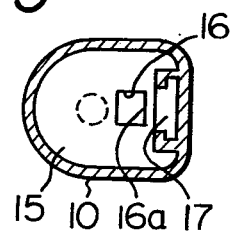
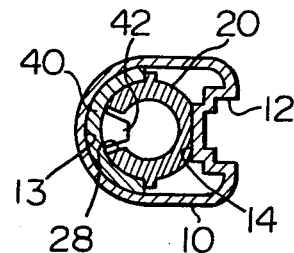
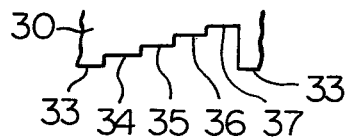

1

REPEATING DISPENSER

BACKGROUND OF THE INVENTION

This invention relates generally to dispensing devices and, particularly to repeating dispensers.

Repeating dispensers have been advantageously utilized in chromatographic work, but it is to be understood that the utility is not confined thereto. Repeating dispensers are utilized to provide, with one filling operation that sucks in a relatively large amount of fluid, repetitive, accurate discharges of exactly the same minute quantities of fluid.

U.S. Pat. No. 3,161,323 shows a repeating dispenser of the type aforementioned, and the construction thereof is simple; however, the dispenser has an index rod having rack teeth thereon and which is exposed to the outside, thus, it is difficult to handle the dispenser.

German patent disclosure No. P 2736551 discloses a generally tubular repeating dispenser having an actuating button on the top end. The dispenser is very easy to handle; however, there is a shortcoming that the relatively large amount of the liquid sucked and stored in the dispenser can only be dispensed by repeatedly depressing the actuating button, and that it is not easy to disassemble a cylinder and a piston from the dispenser which would be required in changing the liquid being sucked in and dispensed.

German patent disclosure No. 2926691 shows another repeating dispenser generally solving the problems aforementioned; however, there are many levers projecting sidewise from a generally tubular main body thus it is objectionable in the handling operation. piston device.

A repeating dispenser according to the invention comprises a tubular main body, an actuating member slidably disposed in the main body with the upper end thereof projecting out of the upper end of the main body and having a pressure button thereon, a spring for biasing upwards the actuating member, a spring retainer slidably disposed in the main body and normally abutting the lower end of the actuating member to transmit the biasing force of the spring to the actuating member, a stop provided on the inner surface of the main body for abutting engagement by the spring retainer in the non-actuated condition of the dispenser, a pawl pivotally connected to the spring retainer, a pawl spring for biasing the pawl in the radially outward direction, a rack shaft slidably provided on a side surface of the main body and having a plurality of rack teeth thereon for engaging with said pawl, means for preventing the pawl from engaging with the rack shaft when the spring retainer abuts against the stop, a suction button connected to the rack shaft and slidable along a longitudinal recess in the main body, and a cylinder piston device with the cylinder thereof being connected to the main body and the piston thereof being connected to the lower end of the rack shaft.

The rack teeth of the rack shaft do not engage with the pawl in the non-actuated condition, thus it is possible to refill or replenish the dispenser at any desired time and, further, the position of the suction button generally indicates the amount of fluid remaining in the cylinder piston device.

Preferably, the dispenser further comprises an adjusting member adjustably and rotatably mounted on the actuating member and having on the lower end thereof a plurality of circumferentially spaced steps for engaging with a second stop provided on the inner surface of the main body when the adjusting member moves downward in depressing the actuating member thereby adjusting the amount of fluid being dispensed in one actuation.

BRIEF DESCRIPTION OF THE DRAWINGS

Further objects and advantages of the invention will become apparent from the following detailed description in conjunction with the drawings exemplifying a preferred embodiment of the invention, in which:

FIG. 1 is a front view of a repeating dispenser according to the invention;

FIG. 2 is a longitudinal sectional view of the dispenser of FIG. 1, taken along line II—II in FIG. 3;

FIG. 3 is a longitudinal sectional view of the dispenser of FIG. 1 with a cylinder piston device thereof removed;

FIG. 4 is an enlarged top view of the dispenser of FIG. 1;

FIG. 5 is an enlarged sectional view taken along line V—V in FIG. 3;

FIG. 6 is an enlarged sectional view taken along line VI—VI in FIG. 3, and

FIG. 7 is a developed view showing steps provided on the lower end of an adjusting member of the dispenser of FIG. 1.

DETAILED DESCRIPTION OF THE PREFERRED EMBODIMENT

The repeating dispenser shown in the drawings comprises a generally tubular main body 10 having on one side of the uppermost portion thereof a sidewise projecting portion 11 for serving as a finger hold. A longitudinally extending groove or recess 12 is formed in one side preferably opposite to the finger hold 11 of the main body 10, as shown in FIG. 6. There are provided on the upper portion of the inner surface of the main body 10 a generally semi-circular guide surface 13 and a flat guide surface 14. The guide surfaces 13 and 14 extend down to a transverse partition wall 15 which is provided on the generally central portion of the main body 10 in the longitudinal direction. An opening 16 is formed in the partition wall 15.

An actuating member 20 having coaxially therethrough an adjusting member 30 is slidably fitted in the main body 10, and is guided by the guide surface 14 and a guide 40 which will be described hereinafter. The upper end of the actuating member 20 projects out of the main body 10 and cooperates with the upper end surface of the adjusting member 30 to constitute a pressure button. An adjusting ring 31 is connected to the adjusting member 30 and is received in a sidewise extending recess or groove 23 in the actuating member 20 so that a portion of the outer circumference of the adjusting ring 31 projects from the side surface of the actuating member 20. In the embodiment, about two-thirds of the outer circumference of the adjusting ring 31 is exposed to the outside as can be clearly understood from FIG. 4.

For indicating the angular position of the adjusting member 30 with respect to the actuating member 20, there are provided respectively on the uppermost surfaces of the actuating member 20 and the adjusting member 30 a reference mark 24 and scale 32 respectively. Further, there are provided a ball 24 and a biasing spring 25 in the actuating member 20, and the ball 24 engages with any one of recesses 38 which are provided in the outer circumference of the adjusting member 30 for clickingly locating the angular position of the adjusting member 30. The adjusting member 30 has on the lower most end thereof a plurality of circumferentially spaced steps 33-37 as shown in FIG. 7, and the recesses 38 and the scale 32 correspond to the steps 33-37.

The guide 40 is fixed to the upper end of the main body 10 by a flange or a sidewise extending projection 41, and has on the lower end thereof an inward projection 42. The upper surface of the projection 42 acts as a stop (the second stop according to the invention) for engaging with any one of the steps 33-37 thereby restricting the downward movement of the adjusting member 30 and, accordingly, of the actuating member 20. There is provided in the lower end portion of the actuating member 20 a cut-out 28 for preventing the actuating member 20 from engaging with the projection 42.

A spring retainer 50 is slidably disposed in the main body 10 and is guided by the surfaces 13 and 14. A coil spring 51 acts between the partition wall 15 and the spring retainer 50 to bias upward the spring retainer 50. In the non-actuated condition, the spring retainer 50 abuts against the lower surface of the projection 42 acting as the first stop according to the invention. In that condition, the spring retainer 50 also abuts against the lower most surface of the actuating member 20. To ensure the engagement between the actuating member 20 and the spring retainer 50, a weak spring (not shown) may be provided for lightly biasing downward the actuating member 30. A pawl 53 is pivotably supported in cutout 52 in the lower surface of the spring retainer 50. The pawl 53 extends downward through the opening 16 in the partition wall 15 and has a pawl claw on the lower end thereof. A pawl spring 54 biases the pawl 53 in the counterclockwise direction as viewed in FIG. 3 or in the direction biasing the pawl claw radially outward. In the non-actuated condition, the radially outer edge of the opening 16 engages with an inclined surface portion of the pawl 53 so that the pawl claw of the pawl 53 is spaced from rack teeth of a rack shaft 45 which will be described hereinafter.

A longitudinally extending groove 17 is formed in the inner surface of the lower half of the main body 10 for slidably receiving therein the rack shaft 45, which has a plurality of rack teeth 46 on the radially inner surface thereof. The groove 17 is so connected with the groove 12 in the outer surface of the upper half of the main body 10 that the rack shaft 45 can slidably move along the grooves 17 and 12. In the non-actuated condition a suction button 47 on the upper end of the rack shaft 45 is supported by the lower end portion of the groove 12.

A first connector 60 is secured to the lower end of the main body 10, and a second connector 65 is connected to the lower end of the rack shaft 45. The second connector 65 is slidably guided by the inner surface of the lower half of the main body 10. The connectors 60 and 65 have respective generally U-shaped grooves 61 and 66 which open to one side (the rightside as viewed in FIG. 3) of the main body 10. The respective grooves 61 and 66 releasably receive a flange 72 of a cylinder 71 and a flange 74 of a piston 73. The cylinder 71 and the piston 73 constitute a cylinder piston device 70. The cylinder piston device 70 shown in the drawings comprises a piston portion 75 working in a generally cylindrical cylinder portion 77 and a tapered piston portion 79 working in a tapered nozzle portion 78; however, the cylinder piston device according to the invention is not limited to the type shown in the drawings.

Shown at 19 in FIGS. 2 and 3 is a cover, and at 76 is an O-ring.

In operation, the distal end of the nozzle 78 is immersed into a reagent bottle or the like, and the suction button 47 is moved upwards along the groove 12. The reagent is sucked into the cylinder of the cylinder piston device 70. The pawl 53 is normally separated from the rack teeth 46 of the rack shaft 45, and thus the suction button 47 can be pushed upwards or downwards. By repeating upward and downward movement of the suction button 47, it is easy to expel air from the cylinder of the cylinder piston device 70.

After sucking a predetermined amount of liquid into the cylinder (usually, the sucking is performed until the suction button 47 takes the uppermost position in the groove 12), the dispenser is displaced onto a test tube or the like and the pressure button (the upper end of the actuating member 20) is depressed downward. The actuating member 20 and the adjusting member 30 move downward against the biasing force of the spring 51 thereby moving downward the spring retainer 50. The pawl 53 supported on the spring retainer 50 moves downward relative to the partition wall 50 so that the inclined surface portion of the pawl 53 separates from the edge of the opening 16 and the pawl 53 rotates in the counterclockwise direction as viewed in FIG. 3. The pawl claw of the pawl 53 engages with a rack tooth of the rack shaft 45 and drives downward the rack shaft 45. The downward movement of the actuating member 20 terminates when one of the steps 33-37 on the lower end of the adjusting member 30 engages with the stop 42. A predetermined amount of liquid which is determined by the downward stroke of the actuating member 20 is dispensed from the cylinder piston device 70.

By releasing the depressing force applied on the actuating member 20, the actuating member 20, the adjusting member 30, the spring retainer 50 and the pawl 53 return to the initial position shown in FIG. 3 due to the biasing force of the spring 51; however, the rack shaft 45 and the piston of the cylinder piston device 70 maintain the downwardly displaced position. By repeating the depressing and releasing, the predetermined same amount of liquid is repeatedly dispensed until the rack shaft 45 and the piston of the cylinder piston device 70 are displaced to the lowermost position shown in FIG. 3.

It will be noted that the non-actuated or released position of the actuating member 20 as shown in FIG. 3 is defined by a shoulder of the actuating member 20 engaging with the flange 41 of the guide 40 as shown in FIG. 2.

The cylinder piston device 70 can easily be demounted from the main body 10 by displacing it rightward in FIG. 3. Therefore, the cylinder piston device may be of a disposable type, and the capacity of the cylinder piston device may be changed as desired.

The amount of the liquid being dispensed on each actuation is determined by the distance between the upper surface of the stop 42 and whichever are of the steps 33-37 is aligned with the stop 42, and the amount can easily be changed by rotating clickingly the adjusting ring 31.

In a preferred embodiment, the normal maximum stroke of the suction button 47 is 48 mm, three types of cylinder piston devices 70 having the maximum capacities of 0.6 ml, 1.5 ml and 6 ml respectively are exchangeably mounted on the main body 10, the pitch of the rack teeth 46 is 0.8 mm, and by rotating the adjusting ring 31 it is possible to control the amount of the liquid being dispensed to correspond to one to five pitches of the rack teeth 46. Therefore, the maximum number of repetitions is 60, 30, 20, 15 and 12 respectively and the amount of liquid being dispensed is 0.01 ml, 0.02 ml, 0.03 ml, 0.04 ml and 0.05 ml; 0.025 ml, 0.05 ml, 0.075 ml, 0.10 ml and 0.125 ml; and 0.1 ml, 0.2 ml, 0.3 ml, 0.4 ml and 0.5 ml respectively.

According to the invention, the actuating button is provided on the top end of the main body, thus, it is easy to depress the actuating button by a finger. The suction button 47 can be operated easily either in sucking the liquid or in discharging the liquid. Further, the cylinder piston device can be exchanged quickly and easily, and the amount of liquid being dispensed can be adjustably varied through a wide range.

What is claimed is:

1. A dispenser for repeatedly dispensing uniform quantities of liquid comprising:
   A. a tubular body having top and bottom ends, said body
      (1) having attachment means at its bottom end for releasably securing thereto a cylinder of a cylinder piston device and
      (2) having radially inwardly projecting stop means intermediate its top and bottom ends defining
         (a) an upwardly facing abutment and
         (b) a downwardly facing abutment;
   B. a spring retainer in said body movable upward to and downward from a normal position engaging said downwardly facing abutment;
   C. a spring reacting between said body and said spring retainer to bias the latter upward to its normal position;
   D. an actuator slidable in said body,
      (1) having a bottom end portion normally engaging said spring retainer, and
      (2) having an upper end portion which projects above the top end of the body and provides a pressure button whereby the spring retainer can be moved downward from its normal position,
      (3) said actuator comprising a member that is rotatably adjustable relative to the body and has at its bottom a plurality of circumferentially spaced axially stepped surfaces, each selectable by rotational adjustment of said member for engagement against said upwardly facing abutment to define one of a plurality of different distances through which the spring retainer can be moved downward from its normal position;
   E. an elongated rack shaft lengthwise slidable upward and downward along a side surface of the body, said rack shaft
      (1) having rack teeth spaced along its length that project inward relative to the body and
      (2) having attachment means at a bottom end thereof for releasably securing thereto a piston of a cylinder piston device;
   F. a pawl pivoted on said spring retainer to swing toward and from engagement with said rack teeth and biased in the direction for such engagement, for constraining the rack shaft to move downward with the spring retainer; and
   G. means on the body, engaged with the pawl when the spring retainer is in its said normal position, for holding the pawl in spaced relation to the rack teeth.

2. The dispenser of claim 1, further characterized by:
   (1) said actuator comprising a substantially tubular outer element
      (a) which is confined to up and down sliding motion in the body;
      (b) on which said bottom end portion is formed, and
      (c) in which said member is rotatable; and
   (2) cooperating click stop means on said outer element and said member for defining positions of rotational adjustment of said member.

3. The dispenser of claim 1 wherein each of said cylinder and said piston of the cylinder piston device has a radially outwardly projecting flange at an upper end thereof, further characterized by:
   each of said attachment means defining an inwardly opening U-shaped groove that has its legs extending sidewardly and wherein one of said flanges is receivable.

4. The dispenser of claim 1 wherein said means on the body for holding the pawl in spaced relation to the rack teeth comprises a shoulder on the body engageable with an inclined surface on the pawl to swing the pawl away from the rack teeth during a final stage of movement of the spring retainer to its normal position and from which the pawl is disengaged as the spring retainer moves down from that position.

5. The dispenser of claim 1, further characterized by:
   a sidewardly projecting suction button fixed on the top of said rack shaft and exposed at an upwardly elongated outwardly opening slot in the body, said suction button cooperating with a bottom end of that slot to define a lowermost position of the rack shaft in the body and enabling up and down movement of the rack shaft relative to the body when the spring retainer is in its normal position.

* * * * *

UNITED STATES PATENT AND TRADEMARK OFFICE
CERTIFICATE OF CORRECTION

PATENT NO. : 4,467,942
DATED : August 28, 1984
INVENTOR(S) : Yuuji Oshikubo

It is certified that error appears in the above-identified patent and that said Letters Patent are hereby corrected as shown below:

On the first page, after [76] Inventor; insert

--[73] Assignee: Nichiryo Co., Ltd., Tokyo, Japan.--.

Signed and Sealed this

Fifth Day of March 1985

[SEAL]

Attest:

DONALD J. QUIGG

Attesting Officer      Acting Commissioner of Patents and Trademarks